United States Patent
Back et al.

(10) Patent No.: US 7,113,801 B2
(45) Date of Patent: Sep. 26, 2006

(54) METHOD FOR RECEIVING DATA USING SMS AND WIRELESS INTERNET AND SYSTEM THEREOF

(75) Inventors: Gap-Chun Back, Uijeongbu-si (KR); Seung-Hyouk Yim, Seoul (KR); Sung-Zoo Park, Seoul (KR)

(73) Assignee: KTFreetel Co., Ltd., Seoul (KR)

( * ) Notice: Subject to any disclaimer, the term of this patent is extended or adjusted under 35 U.S.C. 154(b) by 341 days.

(21) Appl. No.: 10/221,139

(22) PCT Filed: Feb. 6, 2002

(86) PCT No.: PCT/KR02/00176

§ 371 (c)(1),
(2), (4) Date: Sep. 10, 2002

(87) PCT Pub. No.: WO02/063894

PCT Pub. Date: Aug. 15, 2002

(65) Prior Publication Data
US 2003/0036396 A1 Feb. 20, 2003

(30) Foreign Application Priority Data
Feb. 6, 2001 (KR) .................. 10-2001-0005547

(51) Int. Cl.
*H04Q 7/20* (2006.01)
*H04M 3/42* (2006.01)

(52) U.S. Cl. .............. 455/466; 455/414.1; 709/206; 709/227

(58) Field of Classification Search ............ 455/466, 455/456.1–456.6, 414.1–414.4, 445, 556.1, 455/556, 556.2, 412.1, 412.2; 379/207.11, 379/252, 352, 355, 356, 407; 370/352, 401, 370/466, 467, 252, 354–356; 709/203–207, 709/218, 245, 226–230
See application file for complete search history.

(56) References Cited

U.S. PATENT DOCUMENTS

| | | | | |
|---|---|---|---|---|
| 5,903,726 A * | 5/1999 | Donovan et al. | ........... | 709/206 |
| 5,987,504 A * | 11/1999 | Toga | ........... | 709/206 |
| 6,205,330 B1 * | 3/2001 | Winbladh | ........... | 455/426.1 |
| 6,292,669 B1 * | 9/2001 | Meuronen et al. | ........... | 455/466 |
| 6,321,257 B1 * | 11/2001 | Kotola et al. | ........... | 709/219 |
| 6,356,761 B1 * | 3/2002 | Huttunen et al. | ........... | 455/456.1 |
| 6,424,828 B1 * | 7/2002 | Collins et al. | ........... | 455/412.1 |
| 6,430,407 B1 * | 8/2002 | Turtiainen | ........... | 455/411 |
| 6,560,456 B1 * | 5/2003 | Lohtia et al. | ........... | 455/445 |
| 6,587,693 B1 * | 7/2003 | Lumme et al. | ........... | 455/466 |
| 6,865,191 B1 * | 3/2005 | Bengtsson et al. | ........... | 370/475 |
| 6,947,738 B1 * | 9/2005 | Skog et al. | ........... | 455/426.1 |

(Continued)

FOREIGN PATENT DOCUMENTS

EP 0 777 394 A1 * 6/1997

(Continued)

*Primary Examiner*—Charles N. Appiah
(74) *Attorney, Agent, or Firm*—Finnegan, Henderson, Farabow, Garrett & Dunner, L.L.P.

(57) ABSTRACT

The present invention relates to a method and system for receiving data by using the SMS and the wireless Internet. The method comprises the steps of receiving a short message from said service provider, wherein the short message comprises at least a service identifier and site information, determining whether or not there is an application protocol in the site information and executing an IP channel connecting program in correspondence with the application protocol, when the application protocol is in the site information, wherein the data receiving system receives data in correspondence with the application protocol from the service provider by executing the IP channel connecting program.

5 Claims, 4 Drawing Sheets

U.S. PATENT DOCUMENTS

2003/0163580 A1 * 8/2003 Lee .......................... 709/230

FOREIGN PATENT DOCUMENTS

| EP | 964 558 A1 * | 12/1999 |
| --- | --- | --- |
| EP | 1 091 607 A2 | 4/2001 |
| EP | 1 128 627 A1 | 8/2001 |
| KR | 1999-0082676 | 11/1999 |
| KR | 2001-0002782 | 1/2001 |
| WO | WO 98/11744 | 3/1998 |
| WO | WO 98/34422 | 8/1998 |
| WO | WO 99/12365 | 3/1999 |

* cited by examiner

METHOD FOR RECEIVING DATA USING SMS AND WIRELESS INTERNET AND SYSTEM THEREOF

TECHNICAL FIELD

The present invention relates to a method and system for receiving data by using SMS and wireless Internet.

BACKGROUND ART

Recently, a Short Message Service, SMS, has been broadly used between mobile communication users. Also, a wireless Internet has been used more and more.

The SMS facilitates that a sender sends a short message by using mobile communication service to a recipient, then the recipient can receives the short message.

The SMS may be implemented by two ways. The one way is that a sender connects a web site using Internet and transmits a short message to a recipient using mobile communication terminal. The other way is that a sender using mobile communication terminal sends a short message to a recipient using mobile communication terminal.

To receive the short message, a separate terminal is needed. Also, the terminal may receives the short message in the middle of conversation. If a mobile communication terminal may not receive the short messages because of being turned off the power supply of the terminal, the short messages may be stored in a Short Message Service Center, SMSC. After that time, if the power supply is turned on, a message for indicating the arrival of the short messages is displayed on the display device. The terminal may receive the short messages stored in the SMSC according to a predetermined way. Also, recently, a sender, a user of one communication service company, may send short messages to a recipient, a user of another communication service company. Because a short message made of maximum 224 characters of the English may be send by using the SMS technology, the SMS technology has been used for providing weather information, stock information, transacting e-business, and other fields.

With the SMS methods, data of large size (for example, moving pictures) may not be transmitted, because the maximum size of data for transmitting is 224 characters of the English.

By using the wireless Internet technology, data provided by server may be transmitted to a user terminal via an Interworking Function, IWF, and a base station. A user may confirm the received data by handling a user terminal. Otherwise, data transmitted from the user terminal may be transmitted to the server via the IWF and the base station. The IWF has a modem and PPP server. Accordingly, users may receive or transmit data using only mobile communication terminal.

The WAP gateway converts data in HTTP protocol pattern into wireless data. If the function of the WAP gateway is embarked in the user terminal, separate WAP gateway may not be needed. Namely, a mobile communication terminal embarking the ME (Mobile Explorer) developed by MS may execute the function of the WAP gateway.

However, if users wish to use the data service by using the wireless Internet, they should connect the communication channel by handling their terminals and request the data service. Also, the service provider may not provide the data service for the users arbitrary, before the communication channel is connected by the users.

DISCLOSURE OF THE INVENTION

The present invention is intended to overcome the above-mentioned disadvantages. Therefore, it is an object of the present invention to provide a method and system for receiving data by using the SMS and the wireless Internet. The system executes an IP channel connecting program, connects a web site by using the wireless Internet and receives the data.

To achieve the objects, one aspect of the present invention is a method for receiving data by using SMS (Short Message Service) and wireless network in a data receiving system coupled with a service provider through the wireless network. The method comprises the steps of receiving a short message from said service provider, wherein the short message comprises at least a service identifier and site information, determining whether or not there is an application protocol in the site information and executing an IP channel connecting program in correspondence with the application protocol, when the application protocol is in the site information, wherein the data receiving system receives data in correspondence with the application protocol from the service provider by executing the IP channel connecting program.

Moreover, The method further comprises the steps of dividing the short message into data fields and determining whether or not a user in correspondence with the data receiving system is a subscriber by using the service identifier. The data receiving system connects to a site using a URL in correspondence with the application protocol by executing the IP channel connecting program. Also, the application protocol is at least one selected from the group consisting of HTTP, FTP, advertisement, game, stock, sports and news.

Another aspect of the present invention is a user terminal system for receiving data by using SMS (Short Message Service) and wireless network coupled with a service provider through the wireless network. The user terminal system comprises a storage device and a processor that is coupled to said storage device, said storage device storing a short message program and an IP channel connecting program and said processor operative with said short message program to receive a short message from said service provider, wherein the short message comprises at least a service identifier and site information, determine whether or not there is an application protocol in the site information and execute an IP channel connecting program in correspondence with the application protocol, when the application protocol is in the site information, wherein the data receiving system receives data in correspondence with the application protocol from the service provider by executing the IP channel connecting program.

Still another aspect of the present invention is a user terminal system-readable medium having stored thereon the user terminal system-executable instructions for performing the method for receiving data by using SMS (Short Message Service) and wireless network in a data receiving system coupled with a service provider through the wireless network. The method comprising the steps of receiving a short message from said service provider, wherein the short message comprises at least a service identifier and site information, determining whether or not there is an application protocol in the site information and executing an IP channel connecting program in correspondence with the application protocol, when the application protocol is in the site information, wherein the data receiving system receives data in correspondence with the application protocol from the service provider by executing the IP channel connecting program.

BRIEF DESCRIPTION OF THE DRAWINGS

The above objects and other advantages of the present invention will become more apparent in detailed descriptions of the preferred embodiments thereof with reference to the attached drawings, in which.

BEST MODES FOR CARRYING OUT THE INVENTION

Hereinafter, preferred embodiments of the present invention will be described in more detail with reference to the accompanying drawings, but it is understood that the present invention should not be limited to the following embodiments.

Figure 1:
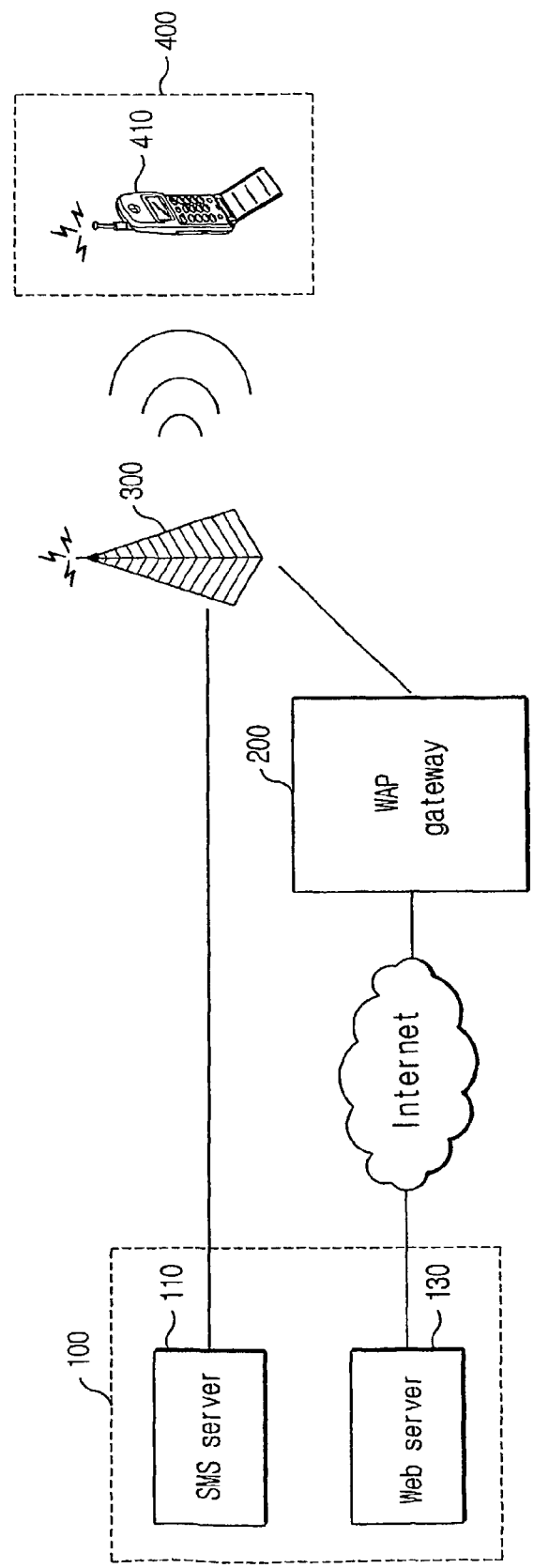
FIG. 1 is a schematic illustration of a data receiving system using SMS (Short Message Service) and wireless Internet in accordance with one preferred embodiment of the present invention.

FIG. 1 is a schematic illustration of a data receiving system using SMS (Short Message Service) and wireless Internet in accordance with one preferred embodiment of the present invention.

Referring to FIG. 1, the data receiving system using SMS and wireless Internet comprises at least one service provider 100, at least one user 400 and a base station which transmits data received from the service provider 100 to the user 400 or transmits data received from the user 400 to the service provider 100.

The service provider 100 comprises a web server 130 and SMS server 110. Or the service provider 100 only may comprise the web server 130 and the SMS server 110 may be comprised of a third business group. Namely, the third business group comprising the SMS server 110 provides site information using for data of the service provider 100 in short message pattern for the user 400.

The web server 130 has been stored various data for users 400. For the purpose of transmitting the various contents provided by the web server to the user 400 via the base station 300, a WAP gateway 200 may be needed. The WAP gateway 200 converts wire data or wireless data provided by the service provider 100 into wireless data or wire data, respectively. Namely, when the data are transmitted from the service provider 100 to the user 400, the WAP gateway 200 receives data in HTTP protocol pattern from the web server 130 via Internet, converts the data in WSP protocol pattern into the data in WSP protocol pattern and transmits the data in WSP protocol pattern to the user terminal 410. By using a browser of the user terminal 410, the data in WSP protocol pattern are displayed. When an ME (Mobile Explorer) is embarked in the user terminal 410, the WAP gateway 200 may not be needed. According to the one preferred embodiment of the present invention, the ME browser may be embarked in the user terminal 410.

The user 400 requests data from the web server 130, by handling the user terminal 410. The web server 130 the data to the user terminal 410 via the base station 300, in correspondence with the user's request.

The SMS server 110 may provide short messages for the user 400. The short messages may comprise a service identifier, site information, and so on. The service identifier is a code assigned in advance, which is used for providing various data from the service provider 100. The site information may comprise application protocols, URLs corresponding to the application protocols and similar data. Also, the application protocols may be HTTPs, FTPs or other protocols.

The user 400 has the user terminal 410 which embarks the ME browser for using the data provided by the service provider 100. The user terminal 410 may receive the short messages transmitted from the service provider 100. Also, the user terminal 410 preferably may have an IP channel connecting program which connects a communication channel automatically according to the short messages and connects a web site corresponding to the URL.

Accordingly, the user 400 may connect the web site using the URL correspondence with the application protocols comprised in the short messages and be provided various data, in spite of requesting data service.

Figure 2:
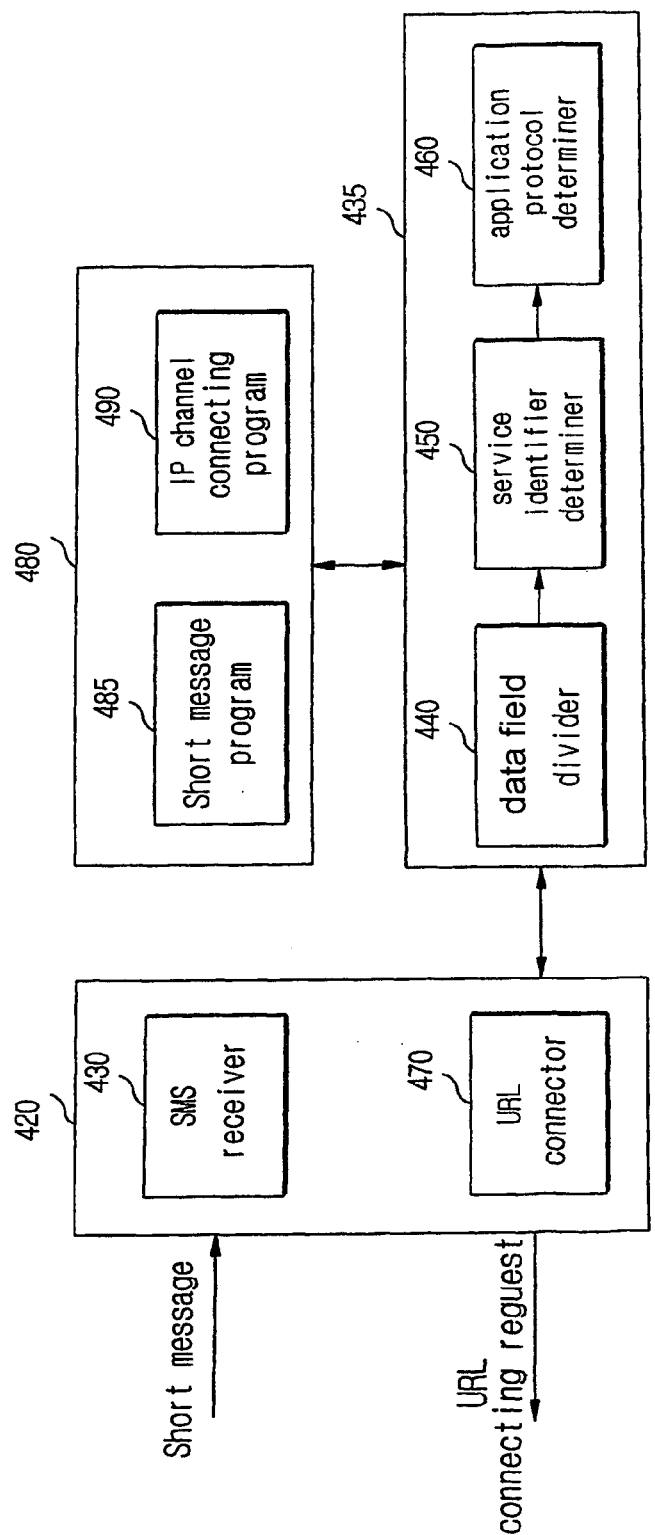
FIG. 2 is a schematic illustration of a user terminal receiving data by using SMS (Short Message Service) and wireless Internet in accordance with one preferred embodiment of the present invention.

FIG. 2 is a schematic illustration of a user terminal receiving data by using SMS (Short Message Service) and wireless Internet in accordance with one preferred embodiment of the present invention.

Referring to FIG. 2, the user terminal 410 receives short messages transmitted from the SMS server 110. The user terminal 410 may comprise a receiver/transmitter 420 for transmitting a URL connecting request, a controller 435 for connecting the communication channel based on application protocols comprised in the received short messages, and storing device 480 for storing program which may be used for executing the controller 435 and connecting the communication channel.

The receiver/transmitter 420 may comprise an SMS receiver 430 for receiving the short messages and a URL connector 470 for transmitting the URL connecting request from the controller 435 to a server.

The storing device 480 may store a short message program 485 and the IP channel connecting program 490. The short message program 485 may be executed, simultaneously with being inputted the short messages in the SMS receiver 430. Also, the IP channel connecting program 490 may connect the communication channel corresponding to the application protocols comprised in the short messages.

The controller 435 may comprise a data field divider 440 for dividing the short messages into data fields by executing the short message program 485, a service identifier determiner 450 for identifying the service identifier comprised in the divided short messages and an application protocol determiner 460 for determining whether or not there are application protocols comprised in the short messages. The data field divider 440, the service identifier determiner 450 and the application protocol determiner 460 may be acting by executing the short message program 485.

The data field divider 440 may divide the short messages received in the SMS receiver 430 into the data fields.

Figure 3:
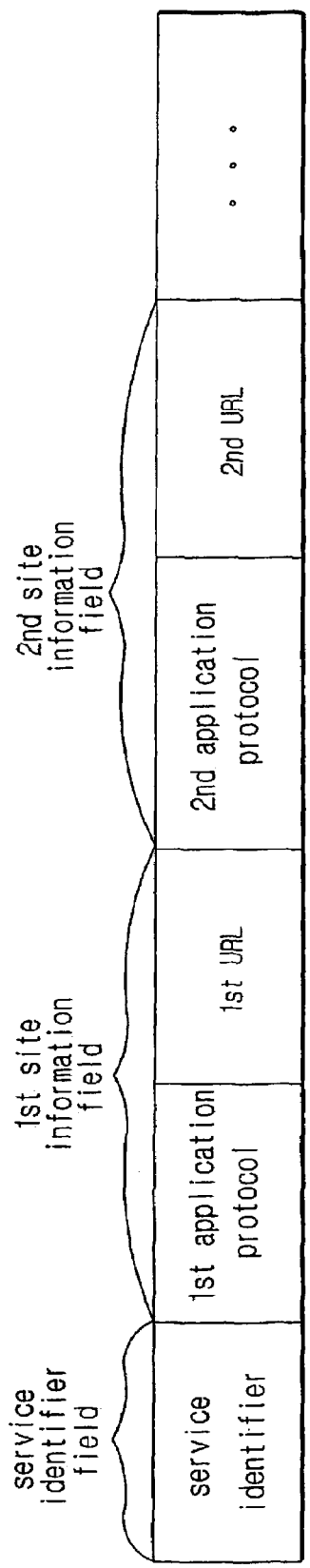
FIG. 3 is an illustration of a data field structure of the short message received from the service provider in accordance with one preferred embodiment of the present invention.

FIG. 3 is an illustration of a data field structure of the short message received from the service provider in accordance with one preferred embodiment of the present invention.

Referring to FIG. 3, the data field divider 440 may divide the short messages provided by service provider 100 into data fields. For example, the data field divider 440 may divide the short messages into a service identifier field, a first site information field, a second site information field, and similar fields. The service identifier field may store service identifiers. The first site information fields may store a first application protocol, a first URL and similar data. Also, the second site information fields may store a second application protocol, a second URL and similar data. The size of each field may preferably be assigned in advance.

When the following short message is received, 0003737: http://www.n016.com/info/info.html: game:// 172.29.148.180/games/tetris.game, the data field divider 440 may divide the short message into the follows:
the service identifier: 0003737;
the first application protocol: http;
the first URL: www.n016.com/info/info.html;
the second application protocol: game;
the second URL: 172.29.148.180/games/tetris.game.

From the data divided by the data field divider 440, the user terminal may recognize a short message that comprises the service identifier (0003737) for the user 400, web site information and information for games.

The service identifier determiner 450 may determine the sort of service that the user 400 has subscribed in advance by using the service identifier divided by the data field divider 440. If the user subscribes to the service provider 100, he may be provided the service identifier. The service provider 100 may store and manage the service identifier provided for the user 400. Also, the service identifier determiner 450 may omit the step of determining whether or not the user 400 is subscriber, because the service provider 100 may transmit the short messages only to the user 400 provided the service identifier.

The application protocol determiner 460 may determine whether or not the application protocol stored in the site information field is comprised in an application protocol list stored in the user terminal 410 in advance. Namely, the application protocol determiner 460 may determine whether or not the IP channel connecting program 490 for executing the application protocol stored in the user terminal 410 is registered. For example, when a application program stored in the user terminal 410 for executing the HTTP application protocol and the game application protocol, the user terminal 410 may connect a web site by using the URL in correspondence with the HTTP application protocol and the game application protocol. If the application protocols comprised in the short message received by the application protocol determiner 460 may be executable, the user terminal may execute automatically the IP channel connecting program 490 in correspondence with the application protocol.

Figure 4:
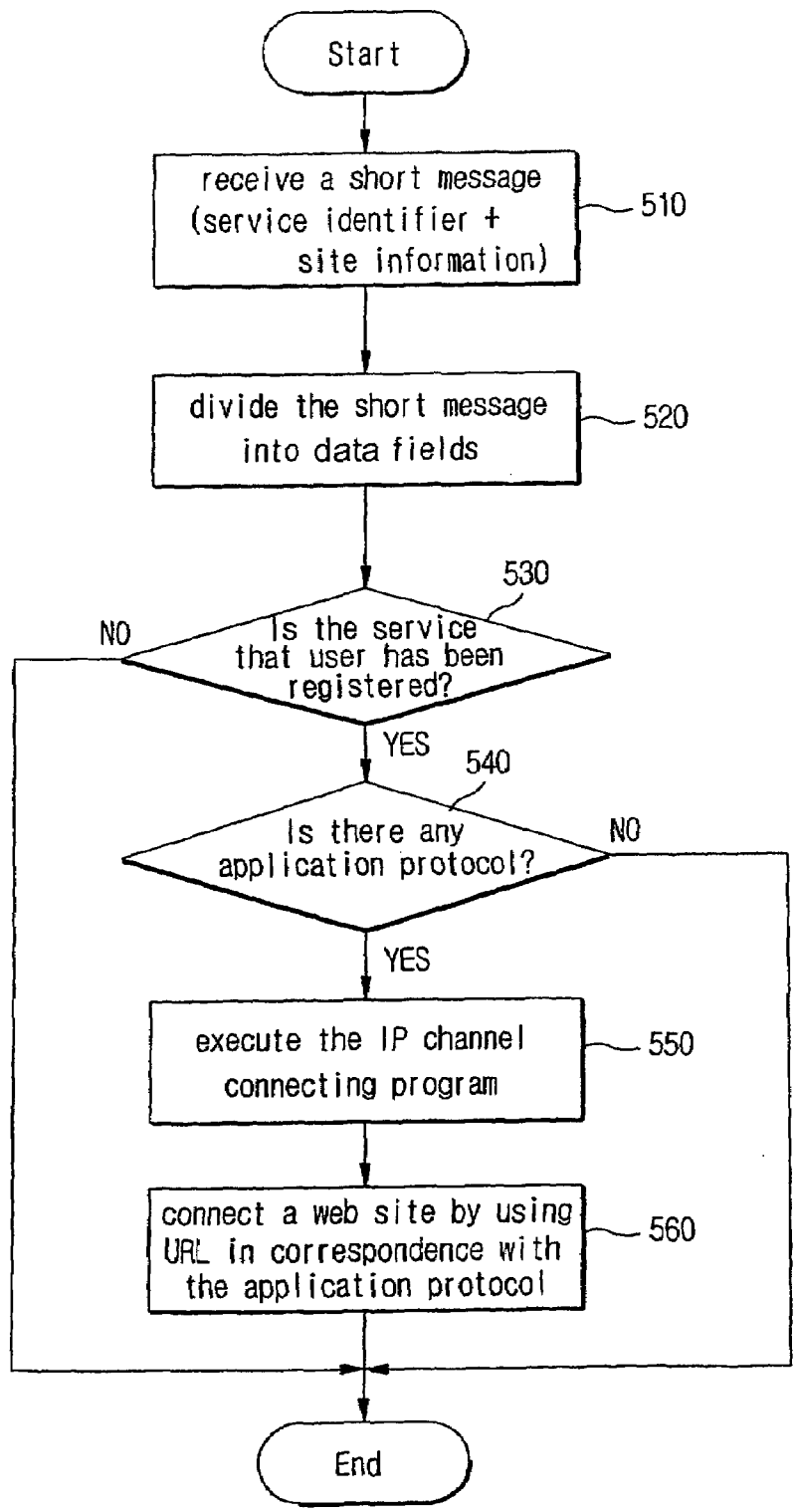
FIG. 4 is a flowchart illustrating an automatically connecting process to a web site by using the URL in correspondence with the application protocol comprised in the short message received by the data receiving system in accordance with one preferred embodiment of the present invention.

FIG. 4 is a flowchart illustrating an automatically connecting process to a web site by using the URL in correspondence with the application protocol comprised in the short message received by the data receiving system in accordance with one preferred embodiment of the present invention.

Referring to FIG. 4, the data receiving system, the user terminal 410, receives the short message transmitted from the service provider 100 (Step 510). The service provider 100 provides the service identifier for the user 400 and transmits the short message to the user 400 in pre-determined period or by the user's request. The short message may comprise a service identifier, site information and other data. Also, the site information may comprise the application protocol, the URL and similar data.

The data receiving system divides the received short message into data fields (Step 520). The data fields may comprise the service identifier fields, site information fields. Also, the size of each data field is preferably pre-determined.

The data receiving system determines the sort of service that the user 400 has subscribed in advance by using the service identifier (Step 530). The service identifier may be managed by the service provider 100 or be stored in the user terminal 410.

The data receiving system determines whether or not the application protocol comprised in the received short message is registered (Step 540). The application protocol comprised in the received in the short message should be registered in the user terminal 410 in advance. If the application protocol is not registered in the user terminal 410, the user terminal 410 may not connect a web site by using the URL in correspondence with the application protocol provided by the service provider 100. In general, the user terminal 410 may embark the IP channel connecting program in correspondence with the HTTP application protocol. Otherwise, the user terminal 410 may have the IP channel connecting program in correspondence with other application protocol (for example, game, sports, news, stock). Accordingly, for connecting to the service provider 100 in correspondence with various application protocols, the IP channel connecting program in correspondence with each application protocol may preferably be embarked in the user terminal 410. If the IP channel connecting program is embarked in the user terminal 410, the application protocol list in correspondence with the IP channel connecting program may be stored in the user terminal 410 or be updated. The user terminal 410, the data receiving system, determines whether or not the application protocol transmitted from the service provider 100 is comprised in the application protocol list.

When the application protocol in the short message is comprised in the application protocol list, the data receiving system may execute the IP channel connecting program (Step 550). The IP channel connecting program may preferably be embarked in the user terminal 410 in advance.

The data receiving system may connect to a web site by using the URL in correspondence with the application protocol provided by the service provider 100, simultaneously with being executed the IP channel connecting program (Step 560). Namely, if the IP channel connecting program is executed, the data receiving system may transmit the URL to the IP channel connecting program and connect the web site by using the URL.

Accordingly, the data receiving system may connect the web site by using the URL, and request data service for the service provider 100. Also, the data receiving system may receive the data transmitted from the service provider 100 and display them on a display device.

INDUSTRIAL APPLICABILITY

According to the method and system for receiving data by using the SMS and wireless Internet in accordance with the present invention, the process for user's handling may be omitted, because the user terminal may execute an IP channel connecting program based on an application protocol comprised in a short message transmitted from a service provider and connect automatically to a web site by using a URL in correspondence with the application protocol.

Also, according to the method and system for receiving data by using the SMS and wireless Internet in accordance with the present invention, the use of data service may maximize by providing various application protocols that users may not recognize.

Also, according to the method and system for receiving data by using the SMS and wireless Internet in accordance with the present invention, users may use data services actively. Accordingly, the profit of the service provider may maximize.

Although the present invention has been described in terms of various embodiments, it is not intended that the invention be limited to these embodiments. Modification within the spirit of the invention will be apparent to those skilled in the art.

The invention claimed is:

1. A method for receiving data by using SMS (Short Message service) and wireless network in a user terminal coupled with a SMS server and at least a web server, comprising the steps of:

receiving a short message at said user terminal from said SMS server, wherein said short message comprises at least an application protocol identifier and URL information;

determining an IP channel-connecting program in correspondence with the application protocol identifier;

executing the IP channel-connecting program in correspondence with the application protocol identifier;

determining an application program in correspondence with the application protocol identifier;

connecting said web server in correspondence with said URL using the application program in correspondence with the application protocol identifier; and receiving said data in correspondence with the application protocol identifier from the web server.

2. The method of claim 1, wherein said short message further comprises a service identifier and further comprising the steps of:

dividing the short message into data fields; and determining whether or not a user in correspondence with the user terminal is a subscriber by using the service identifier.

3. The method of claim 1, wherein said application protocol identifier is at least one selected from a protocol identifier corresponding to hypertext (HTTP), a protocol identifier corresponding to game (GAME) and a protocol identifier corresponding to advertisement(ADVER).

4. A user terminal system for receiving data by using SMS (Short Message service) and wireless network, in the user terminal system coupled with a SMS server and at least a web server, comprising:

a storage device; and a processor coupled to said storage device, said storage device storing a program for controlling said processor; and said processor operative with said program to receive a short message at said user terminal from said SMS server, wherein said short message comprises at least a application protocol identifier and URL information;

determine an IP channel-connecting program in correspondence with the application protocol identifier;

execute the IP channel-connecting program in correspondence with the application protocol identifier;

determine an application program in correspondence with the application protocol identifier;

connect said web server in correspondence with said URL using the application program in correspondence with the application protocol identifier; and receive said data in correspondence with the application protocol identifier from the web server.

5. A user terminal-readable medium having stored thereon the user terminal executable instructions for performing a method for receiving data by using SMS (Short Message service) and wireless network in the user terminal coupled with a SMS server and at least a web server, the method comprising the steps of;

receiving a short message at said user terminal from said SMS server, wherein said short message comprises at least an application protocol identifier and URL information;

determining an IP channel-connecting program in correspondence with the application protocol identifier;

executing the IP channel-connecting program in correspondence with the application protocol identifier;

determining an application program in correspondence with the application protocol identifier;

connecting said web server in correspondence with said URL using the application program in correspondence with the application protocol identifier; and receiving said data in correspondence with the application protocol identifier from the web server.

* * * * *